United States Patent
Tolmasky et al.

(10) Patent No.: US 10,409,461 B2
(45) Date of Patent: Sep. 10, 2019

(54) PORTABLE MULTIFUNCTION DEVICE, METHOD, AND GRAPHICAL USER INTERFACE FOR INTERACTING WITH USER INPUT ELEMENTS IN DISPLAYED CONTENT

(71) Applicant: Apple Inc., Cupertino, CA (US)

(72) Inventors: Francisco Ryan Tolmasky, San Francisco, CA (US); Richard Williamson, Los Gatos, CA (US); Patricia J. Coleman, Montara, CA (US); Christopher Blumenberg, San Francisco, CA (US); Corbin Robert Dunn, Los Gatos, CA (US); Stephen O. Lemay, Palo Alto, CA (US); Marcel Van Os, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/296,751

(22) Filed: Mar. 8, 2019

(65) Prior Publication Data

US 2019/0220155 A1    Jul. 18, 2019

Related U.S. Application Data

(63) Continuation of application No. 15/162,004, filed on May 23, 2016, now Pat. No. 10,228,824, which is a
(Continued)

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0412* (2013.01); *G06F 3/0416* (2013.01);
(Continued)

(58) Field of Classification Search
CPC .. G06F 3/0482; G06F 3/04855; G06F 3/0412; G06F 3/0416; G06F 3/04817;
(Continued)

(56) References Cited

U.S. PATENT DOCUMENTS

| 5,910,800 A | 6/1999 | Shields et al. |
| 6,259,436 B1* | 7/2001 | Moon .................. G06F 3/0488 |
| | | 345/173 |

(Continued)

FOREIGN PATENT DOCUMENTS

| CN | 1331815 A | 1/2002 |
| DE | 10140874 A1 | 3/2003 |

(Continued)

OTHER PUBLICATIONS

International Search Report and Written Opinion received for PCT Patent Application No. PCT/US2007/077777, dated Oct. 8, 2009, 15 pages.

(Continued)

*Primary Examiner* — Andrew Sasinowski
(74) *Attorney, Agent, or Firm* — Dentons US LLP

(57) ABSTRACT

A portable multifunction device configured for displaying an application on a display that includes a first user input element and a second user input element. In response to detecting a first input that corresponds to the selection of a first user input element, enlarging and centering display of a first area that includes the first input element and at least a portion of the second user input element. While displaying the enlarged first area detecting a second input that corresponds to selection of the second user input element. In response to detecting the second input, centering display of the second input element. Subsequent to detecting the second input, receiving input for the second user input element. In response to receiving the input for the second user input (Continued)

element, displaying a representation of the received input in the second user input element.

27 Claims, 16 Drawing Sheets

Related U.S. Application Data continuation of application No. 13/903,961, filed on May 28, 2013, now Pat. No. 9,372,620, which is a continuation of application No. 11/960,394, filed on Dec. 19, 2007, now Pat. No. 8,451,232.

(60) Provisional application No. 60/947,127, filed on Jun. 29, 2007, provisional application No. 60/937,993, filed on Jun. 29, 2007, provisional application No. 60/879,469, filed on Jan. 8, 2007, provisional application No. 60/879,253, filed on Jan. 7, 2007.

(51) Int. Cl.
*G06F 3/0488* (2013.01)
*G06F 3/041* (2006.01)
*H04L 29/06* (2006.01)
*G06F 3/0484* (2013.01)
*G06F 3/0485* (2013.01)
*H04L 29/08* (2006.01)
*H04M 1/2745* (2006.01)
*H04M 1/723* (2006.01)
*H04M 1/725* (2006.01)

(52) U.S. Cl.
CPC ...... *G06F 3/04817* (2013.01); *G06F 3/04842* (2013.01); *G06F 3/04845* (2013.01); *G06F 3/04855* (2013.01); *G06F 3/04883* (2013.01); *G06F 3/04886* (2013.01); *H04L 67/06* (2013.01); *H04L 67/42* (2013.01); *H04M 1/27455* (2013.01); *H04M 1/72522* (2013.01); *H04M 1/72544* (2013.01); *H04M 1/72547* (2013.01); *H04M 1/72561* (2013.01); *H04M 2250/22* (2013.01)

(58) Field of Classification Search
CPC ............. G06F 3/04842; G06F 3/04845; G06F 3/04883; G06F 3/04886; H04L 67/42; H04L 67/06; H04M 1/72522; H04M 1/27455; H04M 2250/22; H04M 1/72561; H04M 1/72547; H04M 1/72544
See application file for complete search history.

(56) References Cited

U.S. PATENT DOCUMENTS

| | | | |
|---|---|---|---|
| 7,222,306 B2 | 5/2007 | Kaasila et al. | |
| 7,694,231 B2 | 4/2010 | Kocienda et al. | |
| 8,161,395 B2 | 4/2012 | Girgaonkar | |
| 8,451,232 B2 | 5/2013 | Tolmasky et al. | |
| 9,372,620 B2 | 6/2016 | Tolmasky et al. | |
| 2002/0056575 A1 | 5/2002 | Keely et al. | |
| 2003/0016252 A1 | 1/2003 | Noy et al. | |
| 2004/0117229 A1 | 6/2004 | Chung et al. | |
| 2005/0052427 A1 | 3/2005 | Wu et al. | |
| 2005/0071761 A1 | 3/2005 | Kontio | |
| 2005/0091577 A1 | 4/2005 | Torres et al. | |
| 2005/0195159 A1 | 9/2005 | Hunleth et al. | |
| 2005/0210399 A1 | 9/2005 | Filner et al. | |
| 2005/0237308 A1* | 10/2005 | Autio ................. | G06F 3/04883 345/173 |
| 2006/0001652 A1 | 1/2006 | Chiu et al. | |
| 2006/0007176 A1 | 1/2006 | Shen | |
| 2006/0026521 A1 | 2/2006 | Hotelling et al. | |
| 2006/0033751 A1 | 2/2006 | Keely et al. | |
| 2006/0047386 A1 | 3/2006 | Kaneysky et al. | |
| 2006/0055662 A1 | 3/2006 | Rimas-ribikauskas et al. | |
| 2006/0085757 A1 | 4/2006 | Andre et al. | |
| 2006/0164399 A1 | 7/2006 | Cheston et al. | |
| 2006/0227116 A1 | 10/2006 | Zotov et al. | |
| 2007/0229465 A1 | 10/2007 | Sakai et al. | |
| 2007/0288855 A1 | 12/2007 | Rohrabaugh et al. | |
| 2009/0109243 A1 | 4/2009 | Kraft et al. | |
| 2009/0303187 A1* | 12/2009 | Pallakoff ............... | G06F 3/0488 345/169 |
| 2010/0088598 A1 | 4/2010 | Lee et al. | |
| 2014/0337712 A1 | 11/2014 | Park | |
| 2016/0266746 A1 | 9/2016 | Tolmasky et al. | |

FOREIGN PATENT DOCUMENTS

| | | |
|---|---|---|
| EP | 269364 A2 | 6/1988 |
| EP | 1517228 A2 | 3/2005 |
| GB | 2341952 A | 3/2000 |
| TW | 408279 B | 10/2000 |
| TW | 498225 B | 8/2002 |
| TW | 200514018 A | 4/2005 |
| WO | 00/38042 A1 | 6/2000 |
| WO | 01/96985 A2 | 12/2001 |
| WO | 02/08881 A2 | 1/2002 |
| WO | 2004/051392 A2 | 6/2004 |
| WO | 2005/018129 A2 | 2/2005 |
| WO | 2005/031551 A1 | 4/2005 |

OTHER PUBLICATIONS

Final Office Action received for U.S. Appl. No. 11/960,394, dated Jul. 27, 2012, 31 pages.
Final Office Action received for U.S. Appl. No. 11/960,394, dated Sep. 28, 2011, 30 pages.
Firefalcon, "Textbox With Tool Tip Control Implementation", http://www.codeproject.com/useritems/testboswithtooltipcontrol.asp, Aug. 6, 2006.
International Preliminary Report on Patentability received for PCT Patent Application No. PCT/US2007/088882, dated Jul. 7, 2009, 8 pages.
International Search Report and Written Opinion received for International Application No. PCT/US2007/088882, dated Jul. 1, 2008, 10 pages.
Javascript, Introduction to Events, < http://www,quirksmode.org/js/introevents.html,> retrieved on Nov. 20, 2006.
Javascript, Introduction to Events, < http://www,quirksmode.org/js/introevents.html,> retrieved on Nov. 20, 2006, 5 pages.
Kaljuvee et al., "Efficient Web Form Entry on PDAs", May 1-5, 2001, 21 pages.
Non-Final Office Action received for U.S. Appl. No. 11/960,394, dated Apr. 9, 2012, 26 pages.
Non-Final Office Action received for U.S. Appl. No. 11/960,394, dated Nov. 13, 2012, 31 pages.
Non-Final Office Action received for U.S. Appl. No. 11/960,394, dated Oct. 25, 2010, 24 pages.
Non-Final Office Action received for U.S. Appl. No. 15/162,004, dated Mar. 28, 2018, 12 pages.
Notice of Allowance received for Taiwan Patent Application No. 104111033, dated Nov. 26, 2015, 6 pages.
Notice of Allowance received for Taiwan Patent Application No. 101103429, dated Feb. 26, 2015, 5 pages.
Notice of Allowance received for U.S. Appl. No. 11/960,394, dated Apr. 12, 2013, 9 pages.
Notice of Allowance received for U.S. Appl. No. 13/903,961, dated Feb. 26, 2016, 11 pages.
Notice of Allowance received for U.S. Appl. No. 15/162,004, dated Nov. 16, 2018, 10 pages.
Office Action received in Taiwan Patent Application No. 097100584, dated Oct. 26, 2011.
Openwave, "Graphical Browser Application Style Guide, Openwave Mobile Browser, WAP Edition 5.0", Openwave Systems Inc., Aug. 2001, 86 pages.

(56) References Cited

OTHER PUBLICATIONS

Opera Software, "Opera for Mobile, the Full Web Anytime, Anywhere", Available at <www.opera.com/mobile>, Jan. 2006, 7 pages.
Opera Software, "Opera for S60 Tutorial", Available at <http://www.xmarks.com/site/www.opera.com/support/tutorials/s60/>, retrieved on Apr. 5, 2006, 5 pages.
Patent Grant received in ROC Application No. I378380, dated Dec. 1, 2012, 5 pages.
Rubine, D., "Specifying Gestures by Example", Computer Graphics vol. 25, No. 4, Jul. 1991, pp. 329-337.
Tidwell, J, "Fill-in-the-Blanks", from Designing Interfaces, Copyright 2006 O'Reilly Media, Inc., pp. 222-223.
Tidwell, J, "Input Hints", from Designing Interfaces, Copyright 2006 O'Reilly Media, Inc., p. 224.
Tidwell, J, "Input Prompt", from Designing Interfaces, Copyright 2006 O'Reilly Media, Inc., pp. 225-226.
Tidwell, J, "Wizard", from Designing interfaces, Copyright 2006 O'Reilly Media, Inc., pp. 42-44.
Tidwell, Jenifer, "Designing Interfaces", Copyright © 2006 O'Reilly Media, Inc., Nov. 2006, 348 pages.

* cited by examiner

PORTABLE MULTIFUNCTION DEVICE, METHOD, AND GRAPHICAL USER INTERFACE FOR INTERACTING WITH USER INPUT ELEMENTS IN DISPLAYED CONTENT

RELATED APPLICATIONS

This application is a continuation of U.S. patent application Ser. No. 15/162,004, entitled "Portable Multifunction Device, Method, and Graphical User Interface for Interacting with User Input Elements in Displayed Content," filed May 23, 2016, now U.S. Pat. No. 10,228,824, which is a continuation of U.S. patent application Ser. No. 13/903,961, entitled "Portable Multifunction Device, Method, and Graphical User Interface for Interacting with User Input Elements in Displayed Content," filed May 28, 2013, now U.S. Pat. No. 9,372,620 which is a continuation of U.S. patent application Ser. No. 11/960,394, entitled "Portable Multifunction Device, Method, and Graphical User Interface for Interacting with User Input Elements in Displayed Content," filed Dec. 19, 2007, now U.S. Pat. No. 8,451,232, which claims priority to U.S. Provisional Patent Application No. 60/947,127, entitled "Portable Multifunction Device, Method, and Graphical User Interface for Interacting with User Input Elements in Displayed Content," filed Jun. 29, 2007; 60/937,993, entitled "Portable Multifunction Device," filed Jun. 29, 2007; 60/879,469, entitled "Portable Multifunction Device," filed Jan. 8, 2007; and 60/879,253, entitled "Portable Multifunction Device," filed Jan. 7, 2007. All of these applications are incorporated by reference herein in their entirety.

This application is related to the following applications (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No.: 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to interacting with user input elements (e.g., radio buttons, text input fields, check boxes, pull down lists, and form fields) on portable electronic devices.

BACKGROUND

As portable electronic devices become more compact, and the number of functions performed by a given device increase, a has become a significant challenge to design a user interface that allows users to easily interact with a multifunction device, This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Furthermore, conventional user interfaces lack a user-friendly way to receive user input is input elements displayed on the screen, such as radio buttons, text input fields, check boxes, pull down lists, and form fields. Users may experience difficulties in selecting input elements, which may be barely legible or illegible.

Accordingly, there is a need for portable multifunction devices with more transparent and intuitive user interfaces for interacting with user input elements that are easy to use, configure, and/or adapt. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device, in some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In one aspect of the invention, a computer-implemented method for use in conjunction with a portable multifunction device with a touch screen display comprises: displaying content on the touch screen display, wherein the content includes a plurality of user input elements; detecting a contact by a finger with the touch screen display; choosing a user input element in the plurality of user input elements based on proximity of the user input element to the contact;

displaying information associated with the chosen user input element over the displayed content; detecting a break in the contact by the finger with the touch screen display; and receiving input for the chosen user input element.

In another aspect of the invention, a graphical user interface on a portable multifunction device with a touch screen display comprises: content that includes a plurality of user input elements; and information associated with a first user input element in the plurality of user input elements. In response to the detection of a contact of a finger with the touch screen display, the first user input element is chosen based on proximity of the first user input element to the contact, and the information associated with the first user input element is displayed over the content. In response to the detection of a break in the contact by the finger with the touch screen display, an area is enlarged that includes the first user input element on the touch screen display. Input is received for the first user input element.

In another aspect of the invention, a portable multifunction device comprises: a touch screen display, one or more processors, memory, and one or more programs. The or more program are stored in the memory and configured to be executed by the one or more processors. The one or more programs include instructions to display content on the touch screen display, wherein the content includes a plurality of user input elements; instructions to detect a contact by a finger with the touch screen display; instructions to choose a user input element in the plurality of user input elements based on proximity of the user input element to the contact; instructions to display information associated with the chosen user input element over the displayed content; instructions to detect a break in the contact by the finger with the touch screen display; and instructions to receive input for the chosen user input element.

In another aspect of the invention, a computer-program product comprises a computer readable storage medium and a computer program mechanism embedded therein. The computer program mechanism comprises instructions, which when executed by a portable multifunction device with a touch screen display, cause the device to display content on the touch screen display, wherein the content includes a plurality of user input elements; detect a contact by a finger with the touch screen display; choose a user input element in the plurality of user input elements based on proximity of the user input element to the contact; display information associated with the chosen user input element over the displayed content; detect a break in the contact by the finger with the touch screen display; and receive input for the chosen user input element.

In another aspect of the invention, a portable multifunction device with a touch screen display comprises means for displaying content on the touch screen display, wherein the content includes a plurality of user input elements; means for detecting a contact by a finger with the touch screen display; means for choosing a user input element in the plurality of user input elements based on proximity of the user input element to the contact; means for displaying information associated with, the chosen user input clement over the displayed content; means for detecting a break in the contact by the finger with the touch screen display; and means for receiving input for the chosen user input element.

The disclosed embodiments allow a user to view more easily information associated with input elements in displayed content and to provide input on as portable device using finger contacts on a touch screen. The user is relieved of having to worry about the precision of his finger contact with respect to selection of input elements. Furthermore, the user can view information and provide input even if the input elements are initially displayed at such a small size that the input elements are illegible or barely legible.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
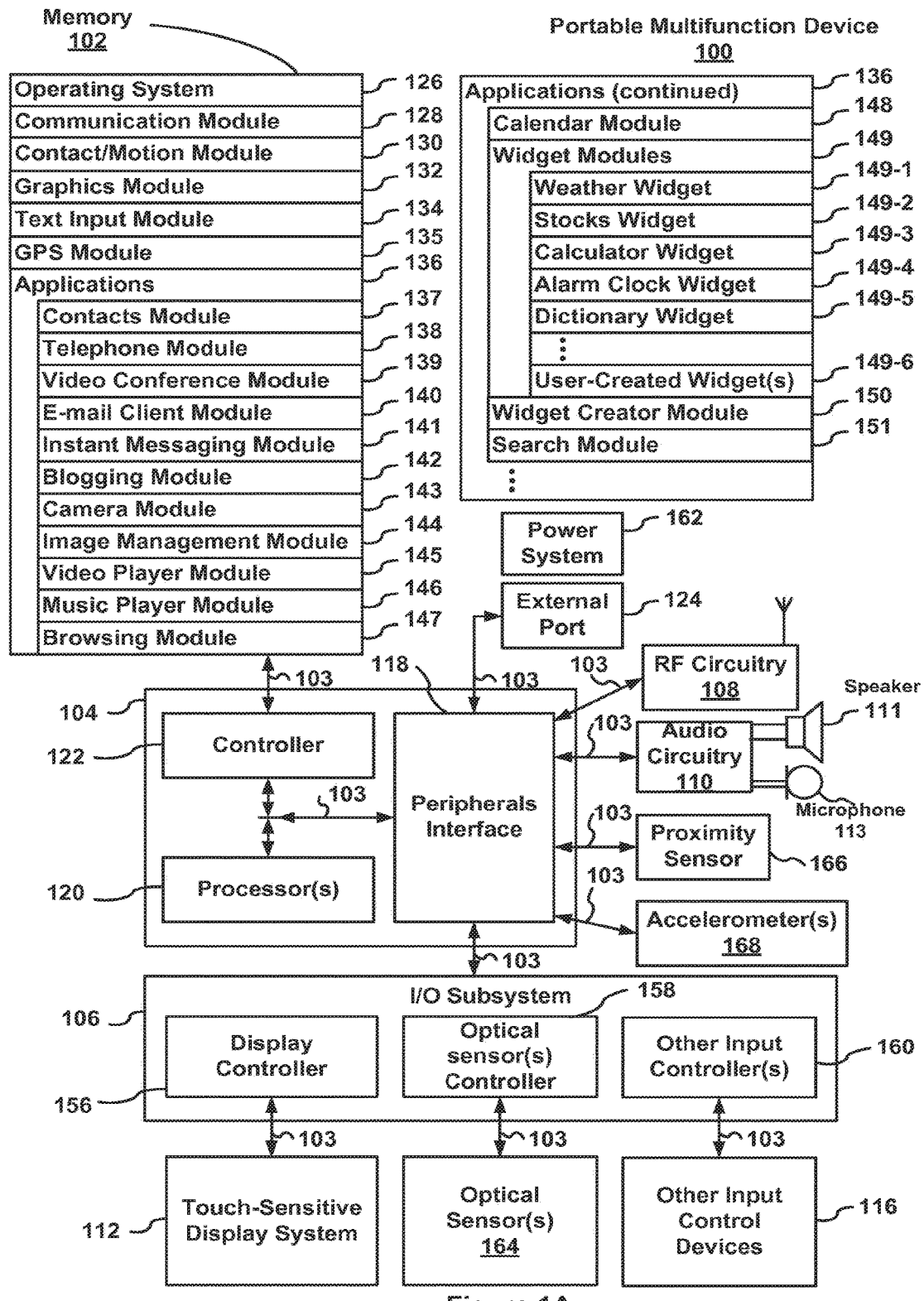
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the in and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel addition to a touch screen or a virtual click wheel displayed on the touch screen. A click wheel is user-interface device that may provide navigation commands based on an angular displacement of the wheel or a point of contact with the wheel by a user of the device. A click wheel may also be used to provide a use command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and U.S. patent application Ser. No. 11/459,615, "Touch Screen Keyboards For Portable Electronic Devices," filed Jul. 24, 2005, the contents of which are hereby incorporated by reference herein in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more. icons, and thus one or more symbols when using the soft keyboard embodiments.

Figure 1B:
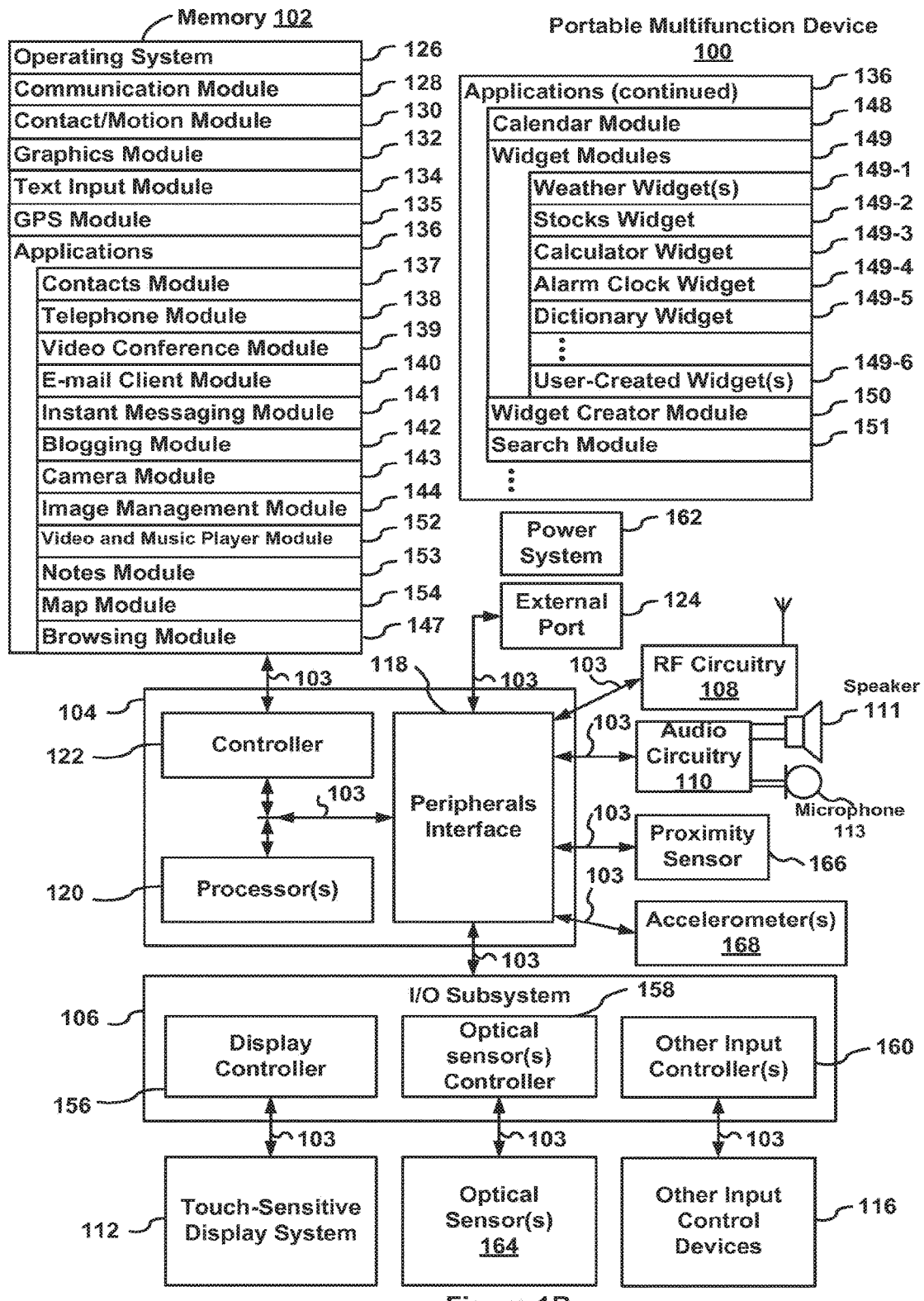

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the, peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 far processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output may headphones or a headset with both output (e.g., a headphone for one or both ears) and input (e.g., a microphone).

The I/O subsystem 106 couples input/output peripherals on the device 100, such as the touch screen 112 and other input/control devices 110, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices a 16 may include physical buttons (e.g., push buttons, rocket buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, a described in U.S. patent application 11/322,549, "Unlocking a Device by Performing Gestures on an Unlock Image," filed Dec. 23, 2005, which is hereby incorporated by reference herein in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instruct in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or 6,677,932 (Westerman), and/or U.S. Patent Publication 2002/0015024A1, which are hereby incorporated by reference herein in her entirety. However, a touch screen 112 displays visual output from the portable device 100, whereas touch sensitive tablets do not provide visual output.

A touch sensitive display in some embodiments of the touch screen 112 may be as described in the following applications; (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004. (3) U.S. patent application Ser. No. 10/903,964, "Gestures For Touch Sensitive Input Devices," feed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 14/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the the generation, management and distribution of power in portable devices.

The device 100 may also include one or more optical sensors 164. FIGS. 1A and 1B show an optical sensor coupled to an optical sensor controller 158 in I/O subsystem 106. The optical sensor a 104 my include charge-coupled device (CCD) or complementary metal-oxide semiconductor (CMOS) phototransistors. The optical sensor 164 receives light front the environment, projected through one or more lens, and converts the light to data representing an image. In conjunction with an imaging module 143 (also called a camera module), the optical sensor 104 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," tiled Sep. 30, 2005; U.S. patent application Ser. No. 11/240,788, "Proximity Detector In Handheld Device," filed Sep. 30, 2005; 11/620,702, "Using Ambient Light Sensor To Augment Proximity Sensor Output"; 11/586,802, "Automated Response To And Sensing Of User Activity In Portable Devices," filed Oct. 24, 2006; and 11/638,251, "Methods And Systems For Automatic Configuration Of Peripherals," which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to the input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications contacts 137, e-mail 140, IM 141, blogging 142, browser 147, and any other application, that needs text input).

The GPS module 135 determines the location of the device and provides this information for use in various applications (e.g., to telephone 138 for use in location-based dialing, to camera 143 and/or logger 142 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- video and music player module 152, which merges video player module 145 and music player module 146;
- notes module 153; and/or
- map module 154.

Examples of other applications 136 that may be stored in memory 102 include other word processing applications, JAVA-enabled applications, encryption, digital rights management, voice recognition, and voice replication.

In conjunction touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 112, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image o video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processing browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu bottom." In some other embodiments, the menu button may be a physical push button of other physical input/control device instead of a touchpad.

Figure 2:
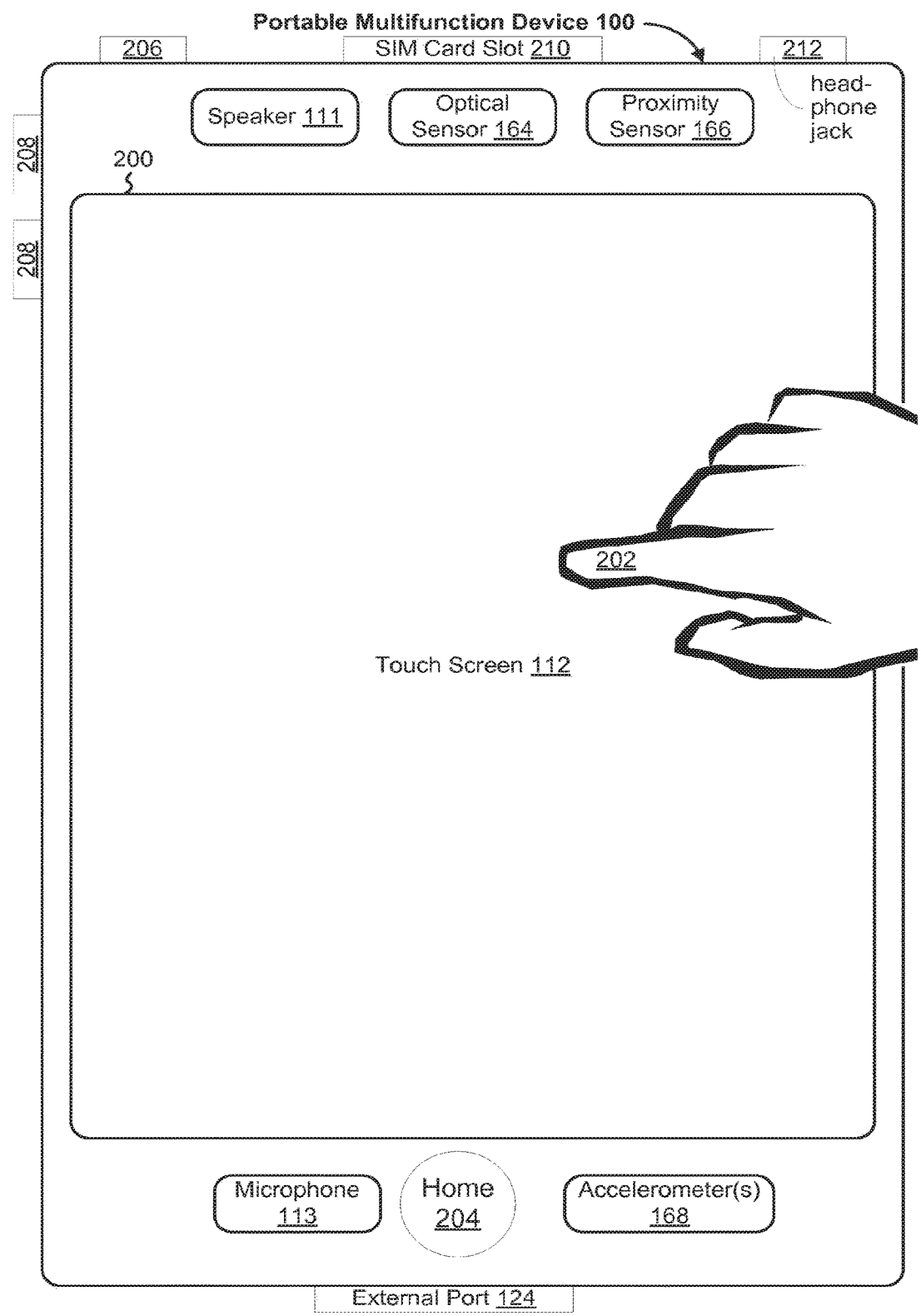
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key is a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined rime interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
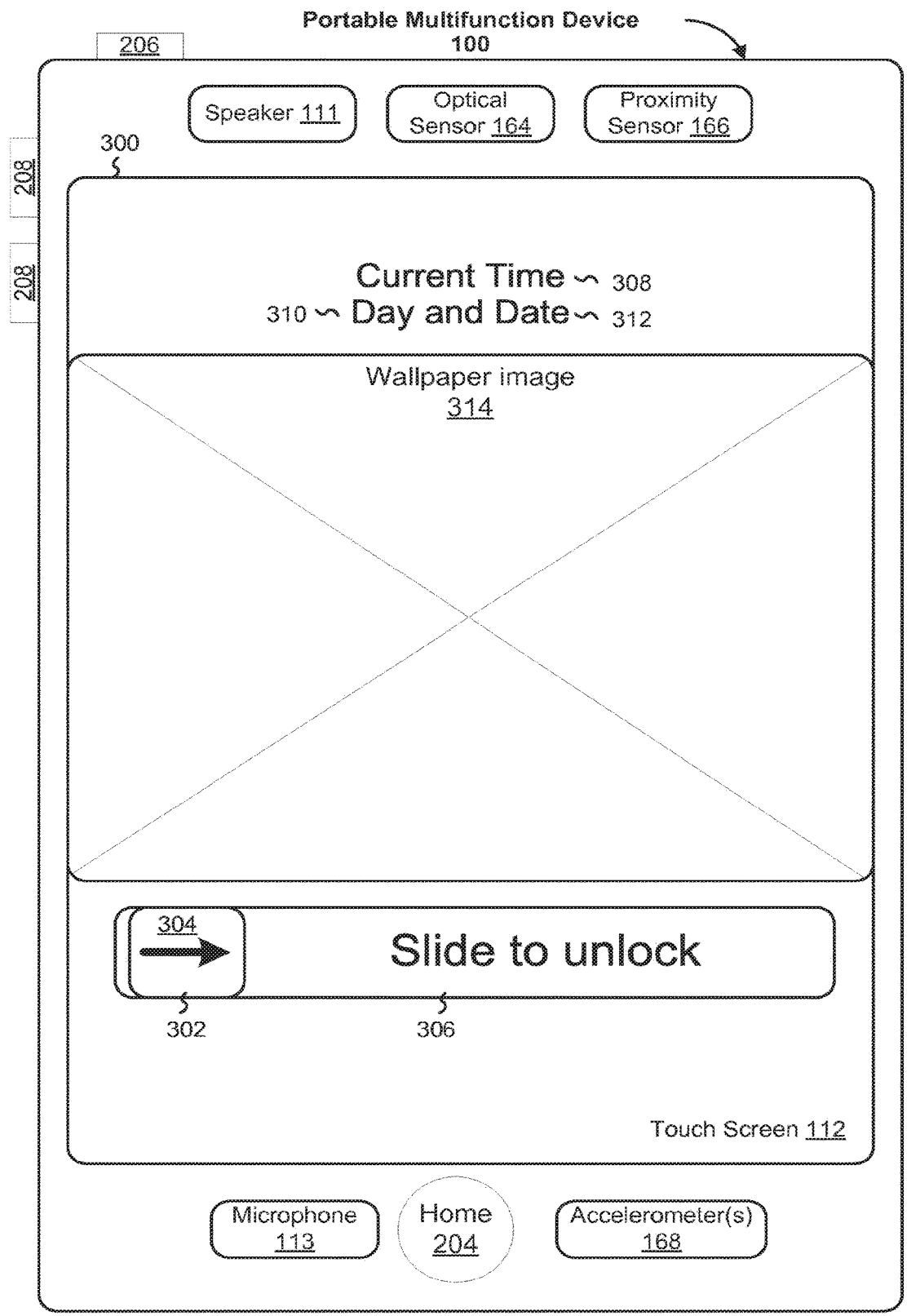
FIG. 3 illustrates an exemplary user interface for unlocking a portable electronic device in accordance with some embodiments.

FIG. 3 illustrates an exemplary user interface for unlocking a portable. electronic device in accordance with some embodiments. In some embodiments, user interface 300 includes the following elements, or a subset or superset thereof:
  Unlock image 302 that is moved with a finger gesture to unlock the device;
  Arrow 304 that provides a visual cue to the unlock gesture;
  Channel 306 that provides additional cues to the unlock gesture;
  Time 308;
  Day 310;
  Date 312; and
  Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/122,549, "Unlocking A Device By Performing Gestures On An Unlock Image," filed Dec. 23, 2005, and 11/322,550, "Indication Of Progress Towards Satisfaction Of A User Input Condition," filed Dec. 23, 2005, which are hereby incorporated by reference herein in their entirety.

Figure 4A:
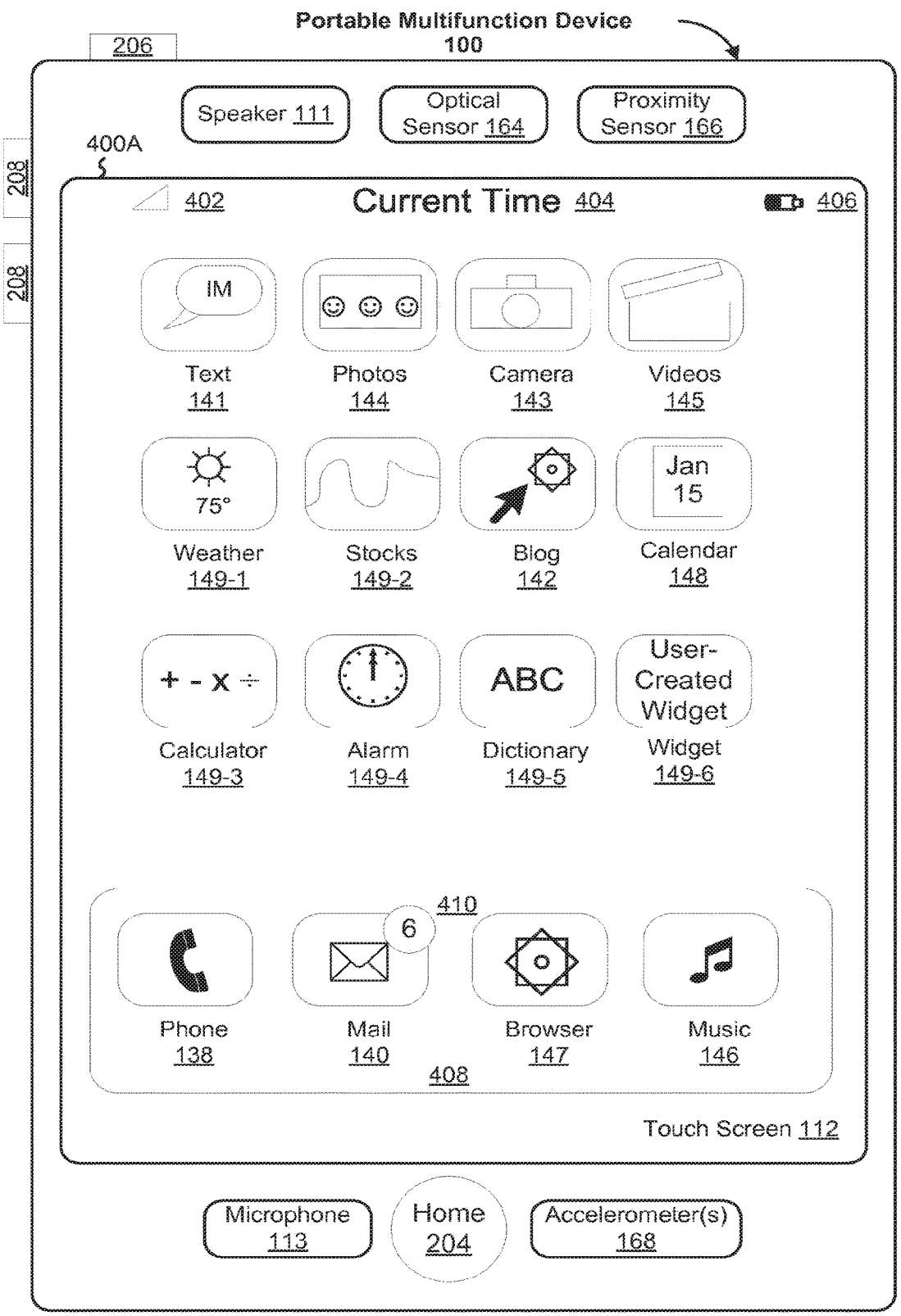
FIGS. 4A and 4B illustrate exemplary user interfaces for a menu of applications on a portable multifunction device in accordance with some embodiments.
Figure 4B:
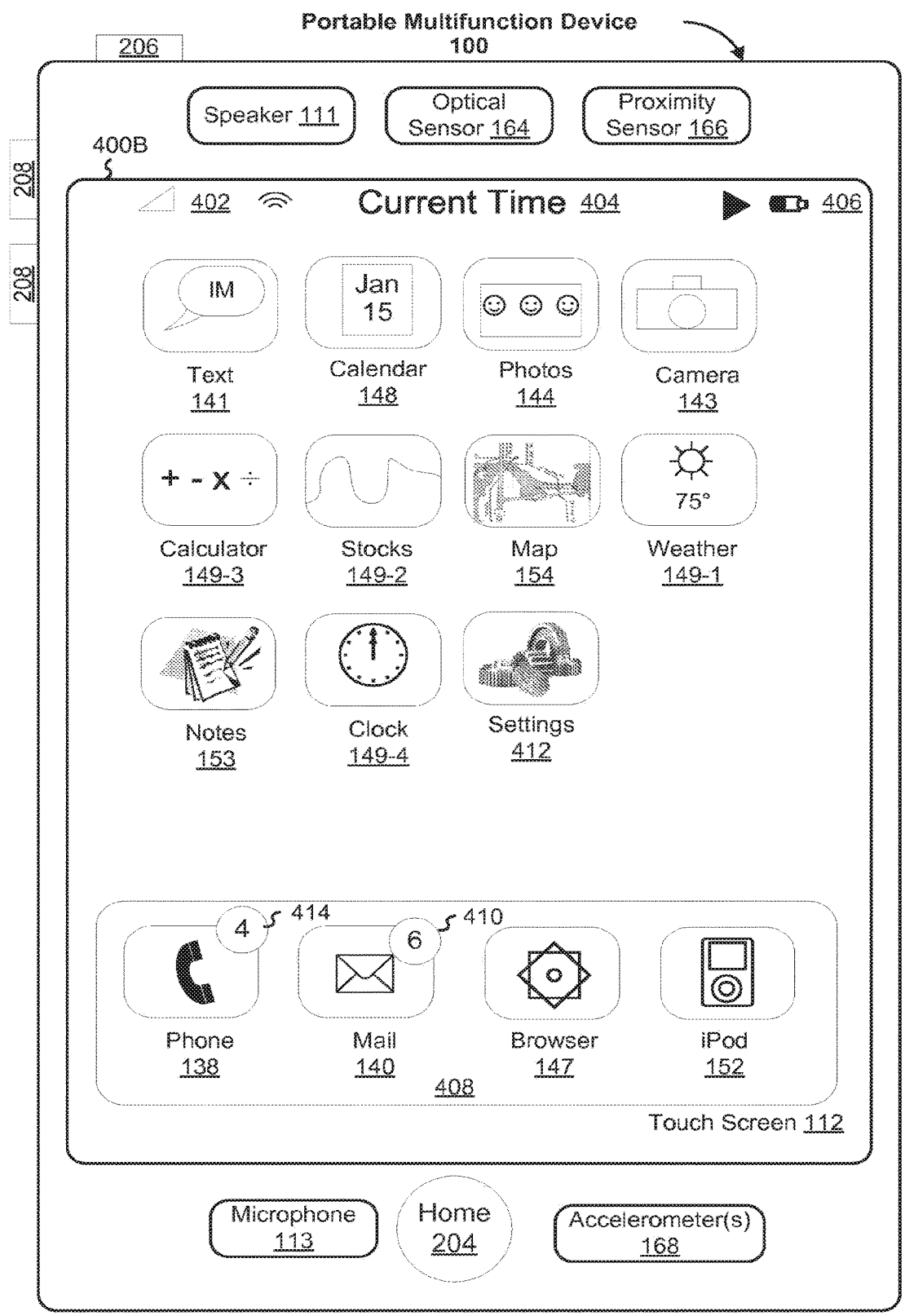

FIGS. 4A and 4B illustrate exemplary user interfaces for a menu of applications on a portable multifunction device in accordance with some embodiments. In some embodiments, user interface 400A includes the following elements, or a subset or superset thereof:
  Signal strength indicator(s) 402 for wireless communication(s), such as cellular and Wi-Fi signals;
  Time 404;
  Battery status indicator 406;
  Tray 408 with icons for frequently used applications, such as one or more of the following:
    Phone 138, which may include an indicator 414 of the number of missed calls or voicemail messages;
    E-mail client 140, which may include an indicator 410 of the number of unread e-mails;
    Browser 147; and
    Music player 146; and
  Icons for other applications, such as one or more of the following:
    IM 141;
    Image management 144;
    Camera 143;
    Video player 145;
    Weather 149-1;
    Stocks 149-2;
    Blog 142;
    Calendar 148;
    Calculator 149-3;
    Alarm clock 149-4;
    Dictionary 149-5; and
    User-created widget 149-6.

In some embodiments, user interface 400B includes the following elements, or a subset or superset thereof:
  402, 404, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136, as described further below; and
  Video and music player 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, the number of applications increase, the icons corresponding to the applications may decrease in size so that all applications may be displayed on a single screen without scrolling. In some embodiments, having all applications on one screen and a menu button enables a user to access any desired applications with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. Patent Application No. 11/459,602, "Portable Electronic Device With Interface Reconfiguration Mode," filed Jul. 24, 2006, which is hereby incorporated by reference herein in us entirety. For example, a user may move application icons in and out of tray 408 using finger gestures.

In some embodiments, UI 400A or 400B includes a gauge (not shown) that displays an updated account usage metric for an account associated with usage of the device a cellular phone account), as described in U.S. patent application Ser. No. 11/322,552, "Account Information Display For Portable Communication Device," filed Dec. 23, 2005, which is hereby incorporated by reference in its entirety.

FIGS. 5A-5E illustrate exemplary user interfaces for interacting with user input elements in displayed content in accordance with same embodiments. In some embodiments, the displayed content (e.g., a web page or other electronic content) is displayed by a web browser application (e.g., browsing module 147).

Figure 5B:
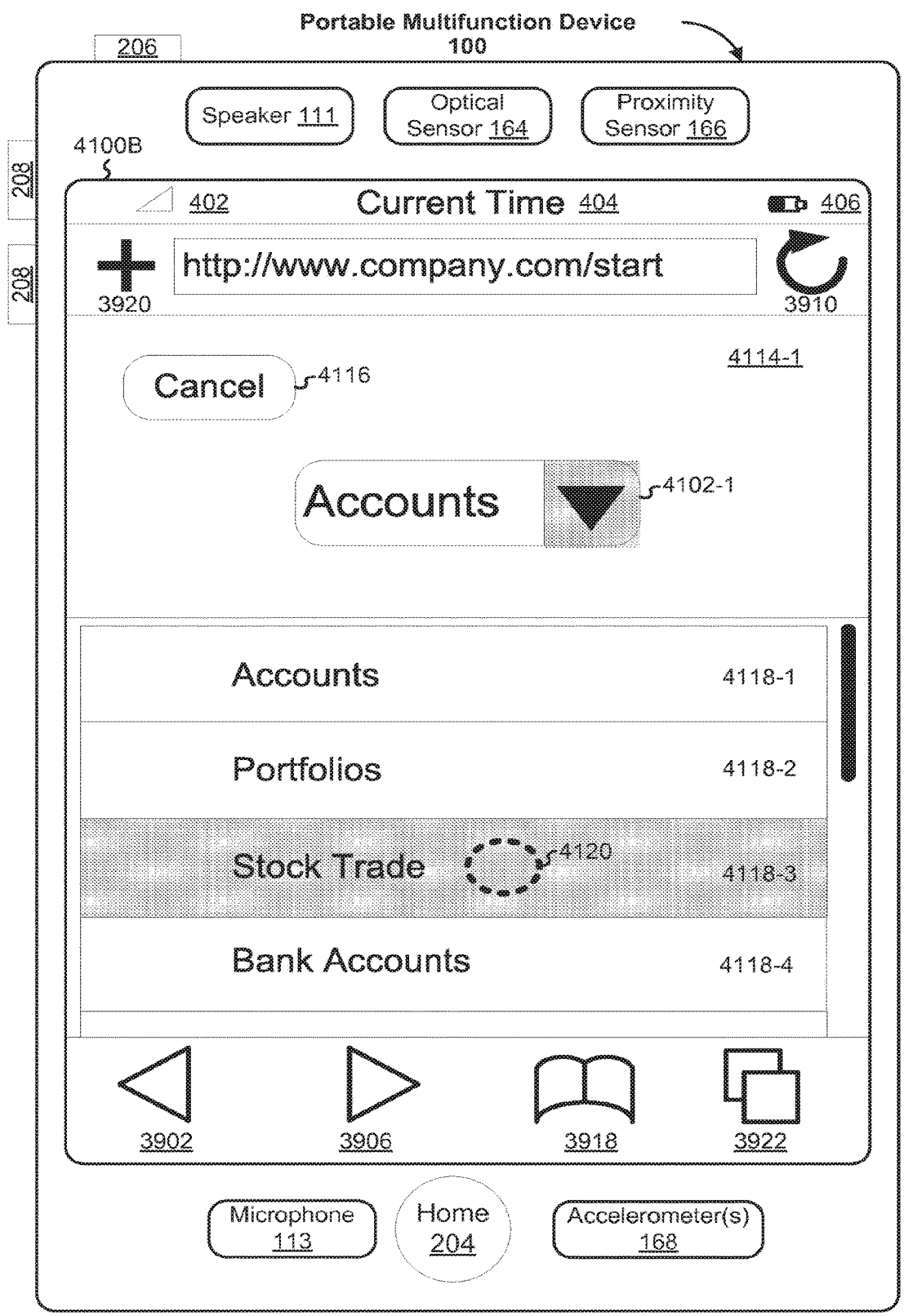
Figure 5D:
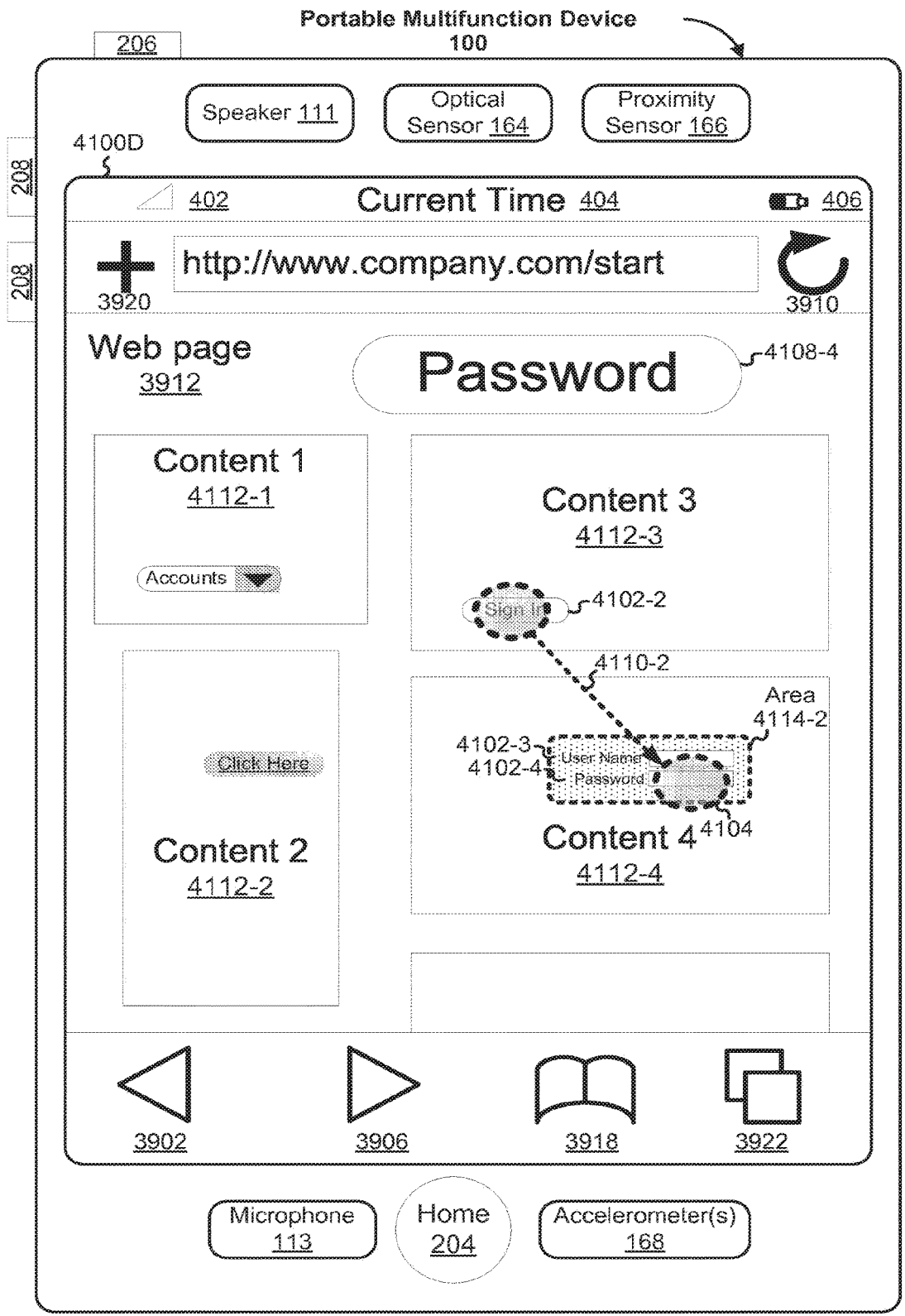
Figure 5E:
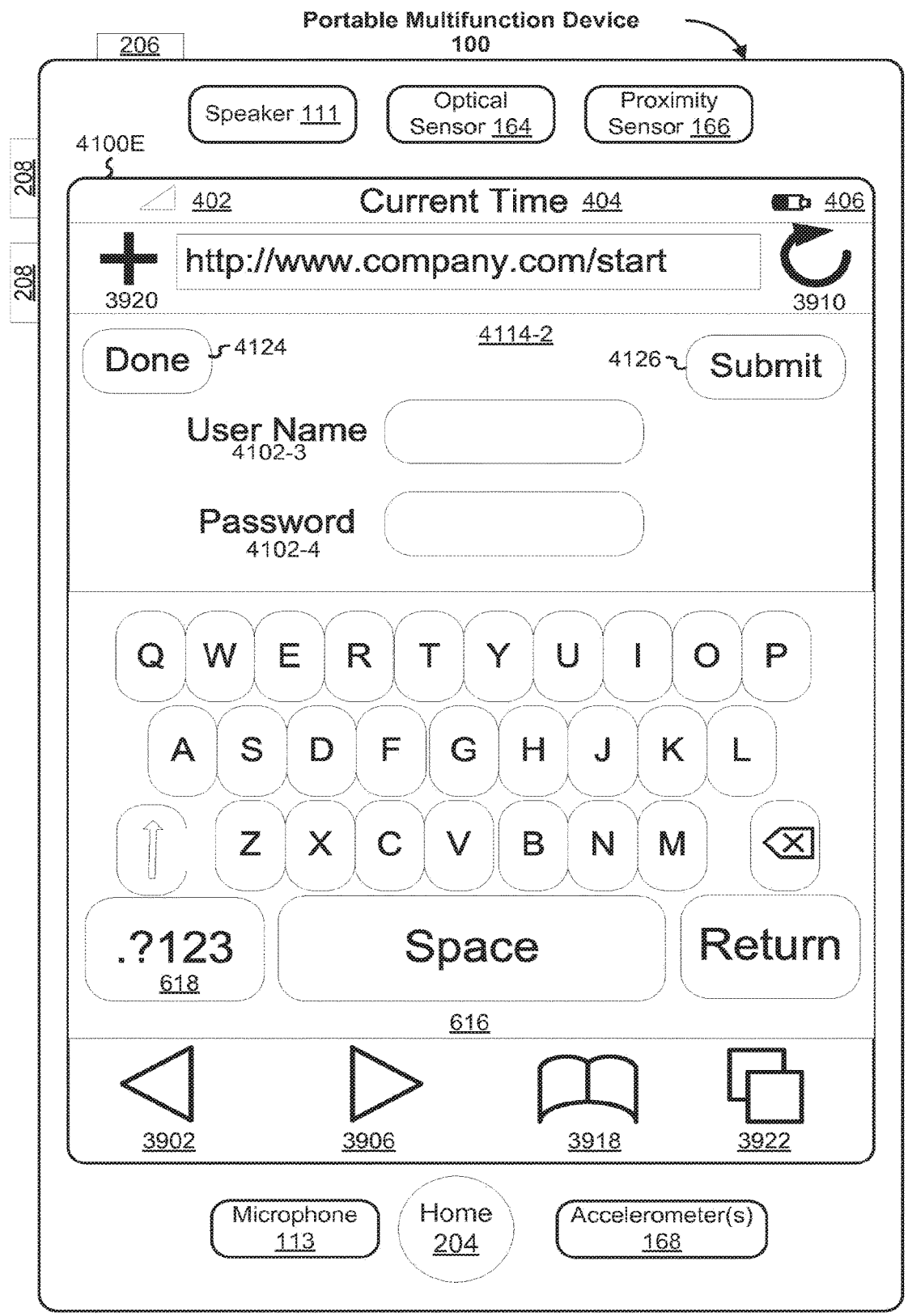
Figure 6A:
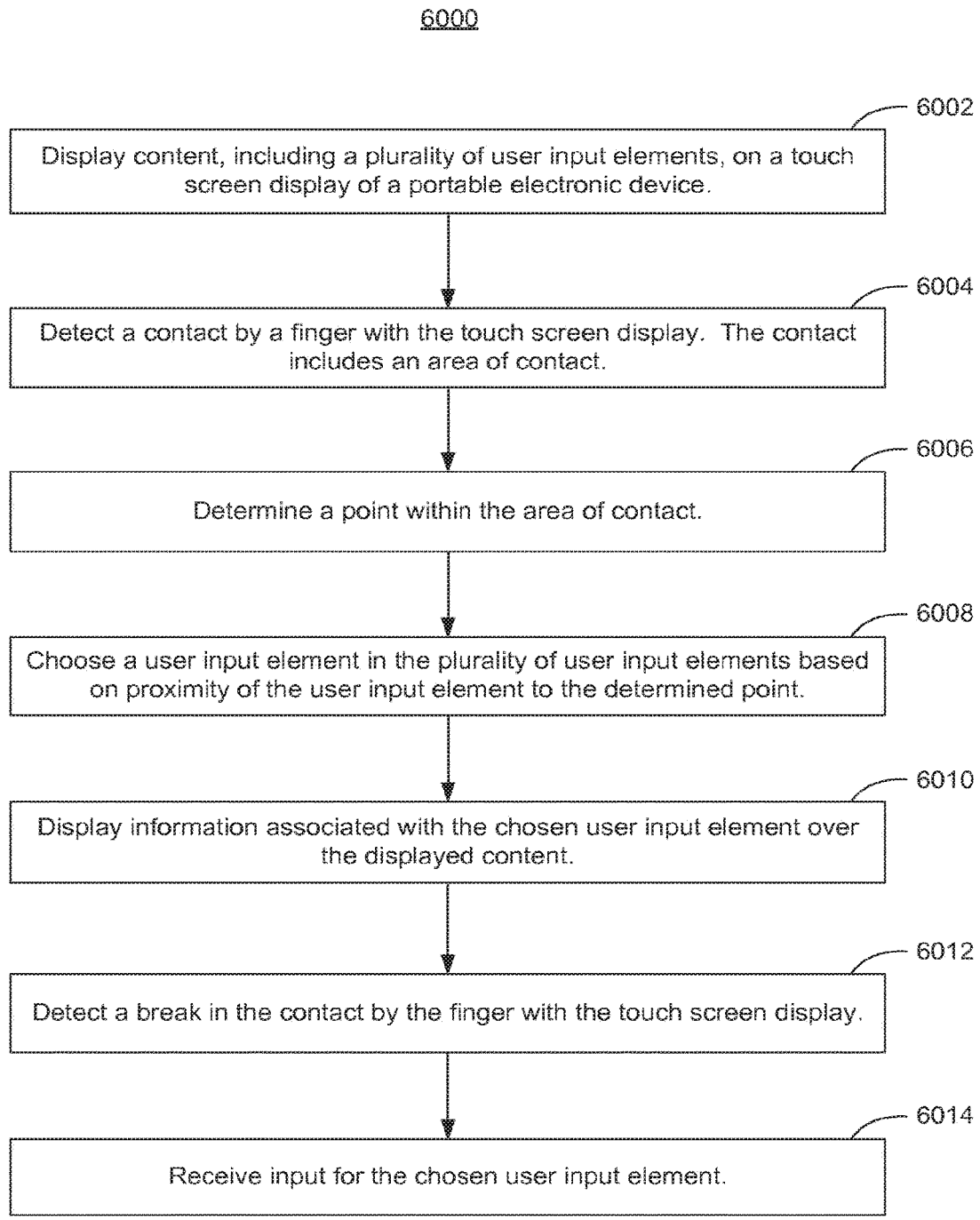
FIGS. 6A-6E are flow diagrams illustrating processes for receiving input in accordance with some embodiments.
Figure 6B:
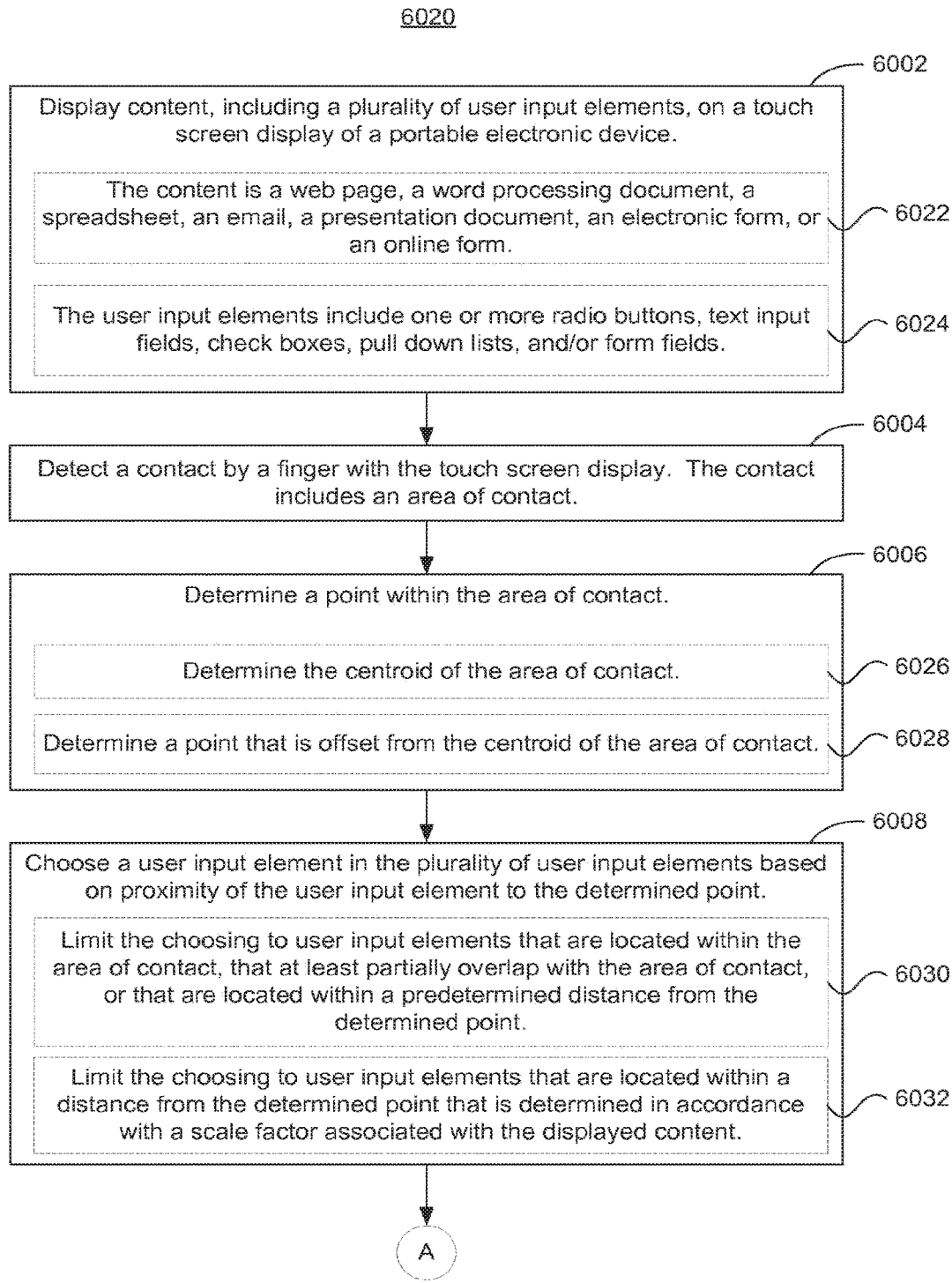
Figure 6C:
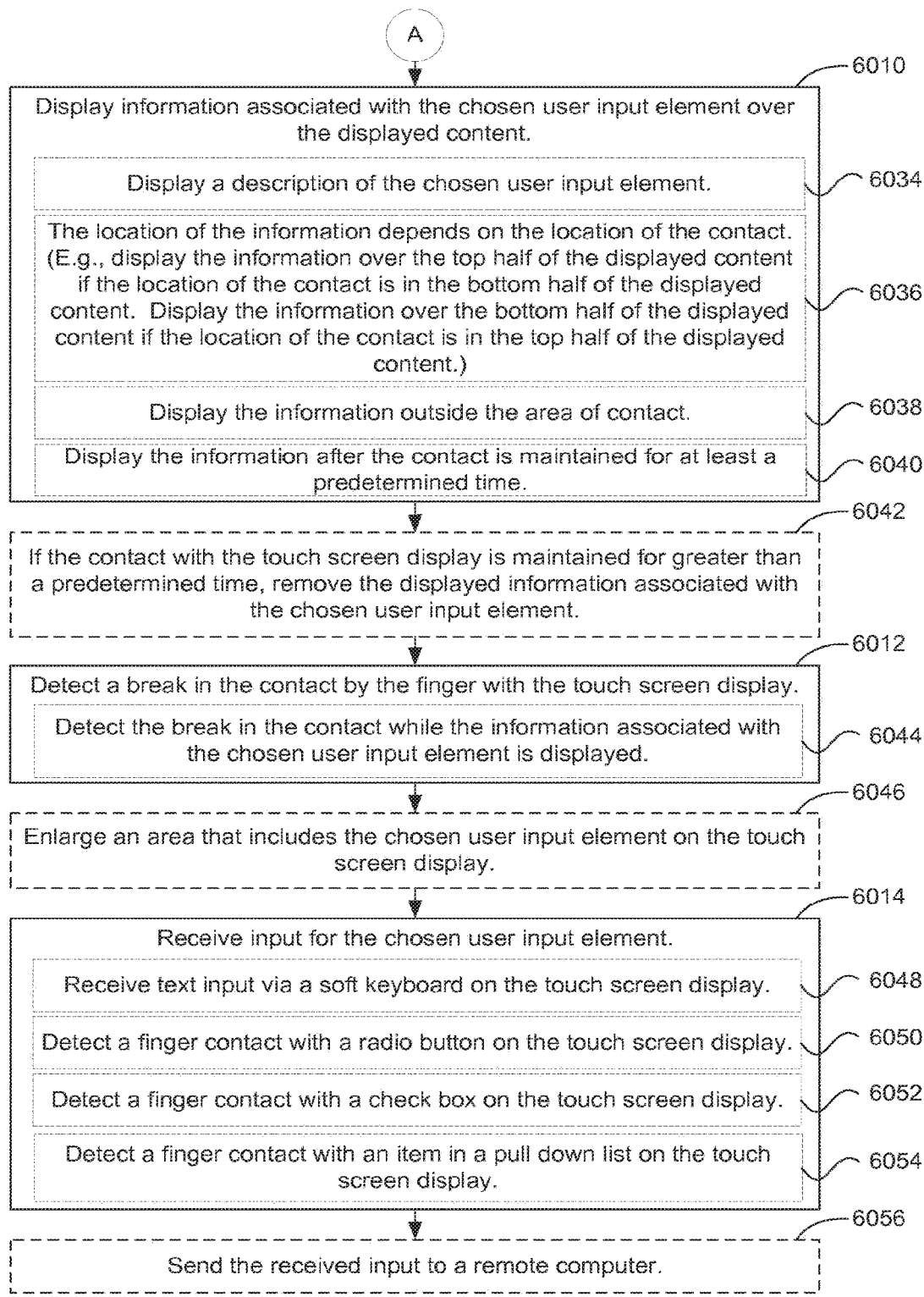

In some embodiments, user interfaces 4100A-4100E (FIGS. 5A-5E) include the following elements, or a subset or superset thereof:

- 402, 404, and 406, as described above;
- Previous page icon 3902 that when activated (e.g., by a finger tap on the icon) initiates display of the previous web page;
- Next page icon 3906 that when activated (e.g., by a finger tap on the icon) initiates display of the next web page;
- Refresh icon 3910 that when activated (e.g., by a finger tap on the icon) initiates a refresh of the web page;
- Web page 3912 or other structured document;
- Bookmarks icon 3918 that when activated (e.g., by a finger tap on the icon) initiates display of a bookmarks list or menu for the browser;
- Add bookmark icon 3920 that when activated (e.g., by a finger tap on the icon) initiates display of a UI for adding bookmarks;
- New window icon 3922 that when activated (e.g., by a finger tap on the icon) initiates display of a UI for adding new windows to the browser;
- Content 4112, such as web page content; a word processing, spreadsheet, entail or presentation document; an electronic form; or an online form;
- User input elements 4102 in the content 4112, such as radio buttons, text input fields, check boxes, pull down lists, and/or form fields;
- Information 4108 about a chosen user input element 4102;
- Area 4114 that includes a chosen user input element 4102;
- Cancel icon 4116 (FIG. 5B) that when activated (e.g., by a finger tap on the icon) cancels user input into the chosen element 4102;
- Input choices 4118 (FIG. 5B) that when activated (e.g., by a finger tap on the icon) are used as input for the chosen dement 4102;
- Done icon 4124 (FIG. 5E) that when activated (e.g., by a finger tap on the icon) returns the device to the previous UI (e.g., UI 4100D, FIG. 5D);
- Submit icon 4126 (FIG. 5E) that when activated (e.g., by a finger tap on the icon) sends the input to a remote server;
- Letter keyboard 616 (FIG. 5E) for entering text;
- Alternate: keyboard selector icon 618 (FIG. 5E) that when activated (e.g., by a finger tap on the icon) initiates the display of a different keyboard; and FIGS. 6A-6C are flow diagrams illustrating methods 6000 (FIG. 6A) and 6020 (FIG. 6B-6C) for receiving input, in accordance with some embodiments. The operations in method 6020 are a superset of the operations in method 6000.

In some embodiments, a portable multifunction device (e.g., device 100) displays (6002) content (e.g., content 4112, FIG. 5A) on a touch screen display. The content includes a plurality of user input elements (e.g., 4102).

Figure 5A:
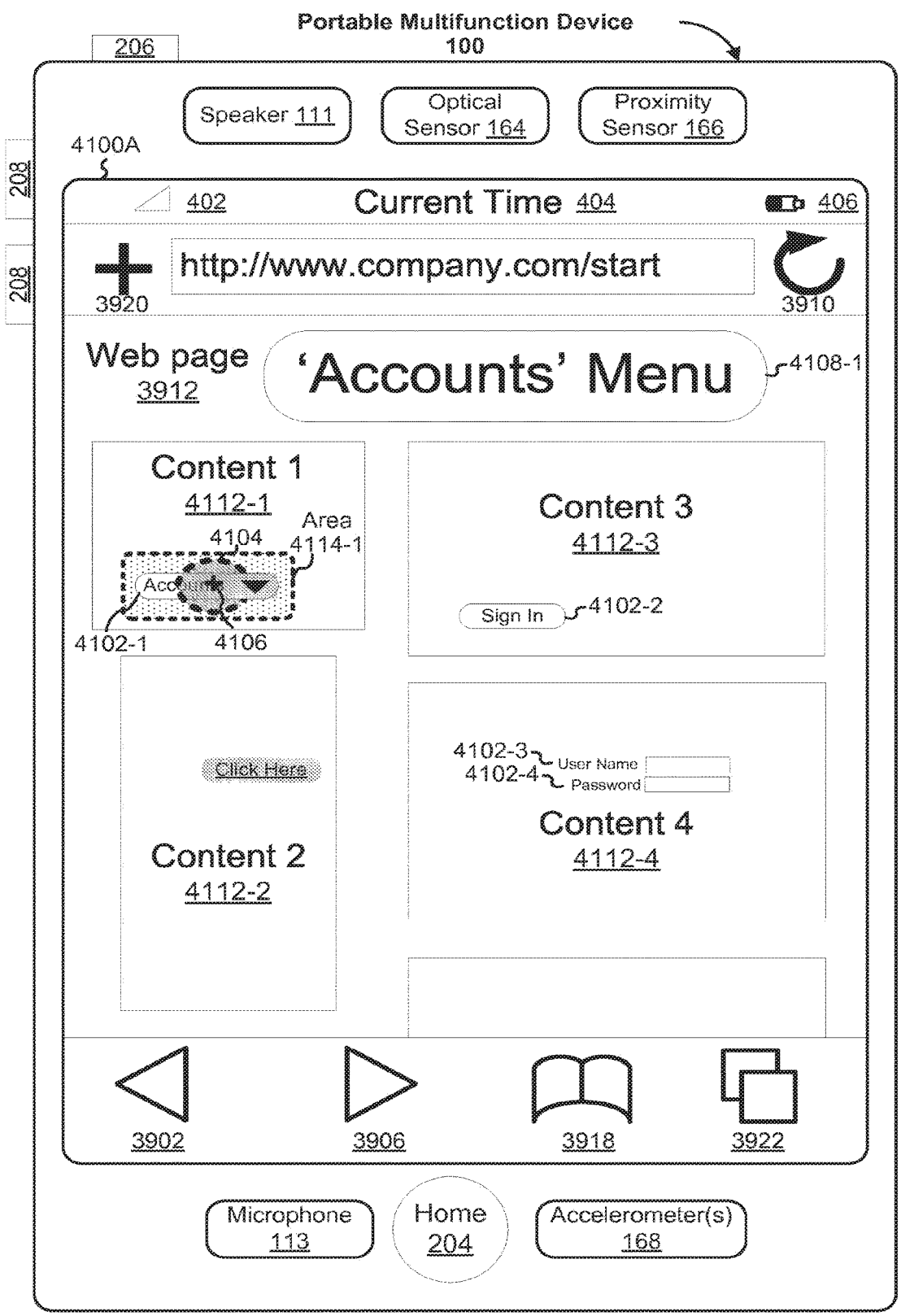
FIGS. 5A-5E illustrate exemplary user interfaces for interacting with user input elements in displayed content in accordance with some embodiments.
Figure 5C:
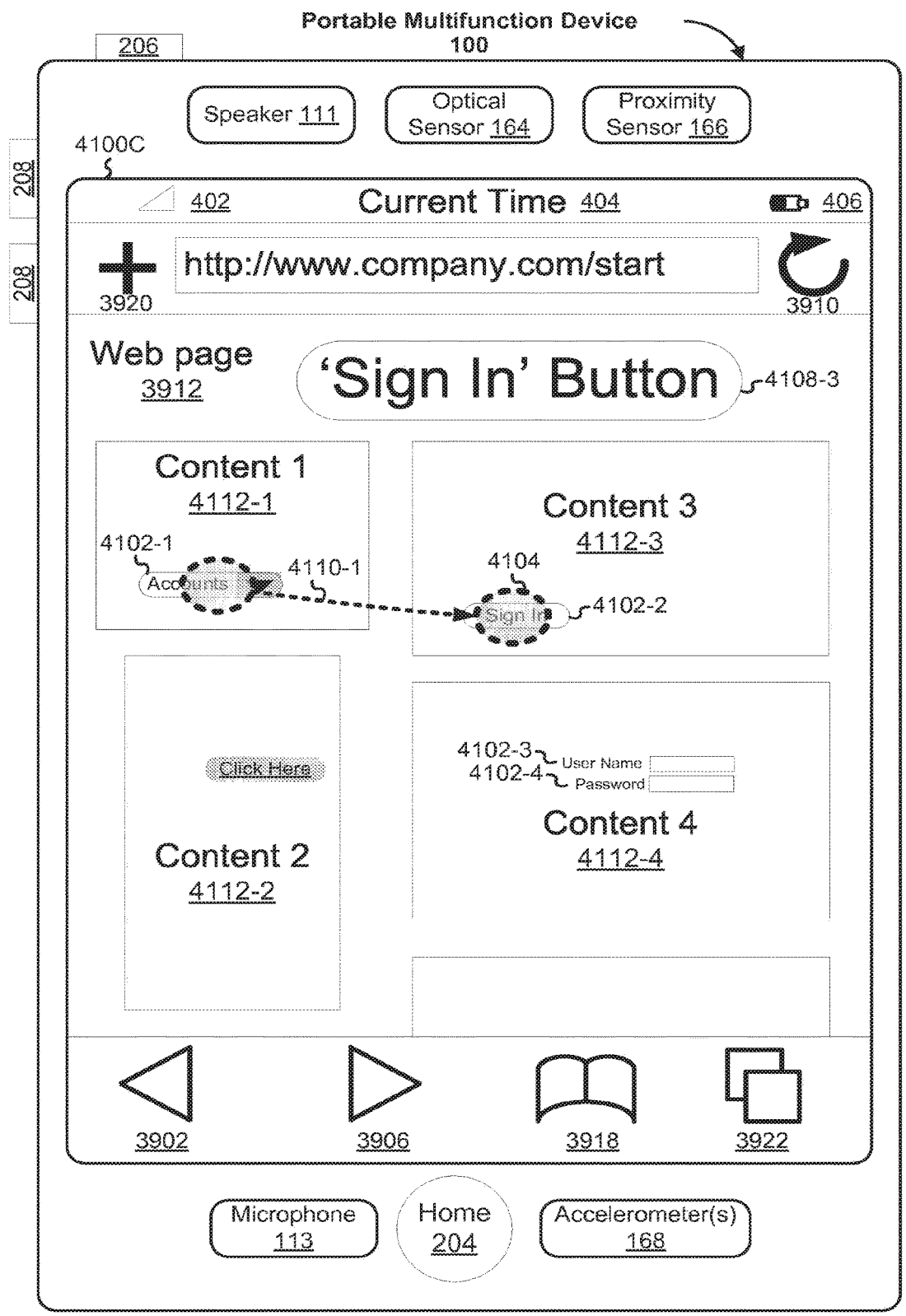

In some embodiments, the content is a web page (e.g., web page 3912, FIG. 5A). In some embodiments, the content is a word processing, spreadsheet, email, or presentation document. In some embodiments, the content is an electronic form. In some embodiments, the content is an online form (6022).

In some embodiments, the user input elements (e.g., 4102) include (6024) one or more radio buttons, text input fields, check boxes, pull down lists (e.g., 4102-1, FIG. 5A), and/or form fields (e.g., user name 4102-3, FIG. 5A).

A contact by a finger (e.g., 4104, FIG. 5A) is detected (6004) with the touch screen display. The contact in an area of contact.

A user input element (e.g., 4102-1, FIG. 5A) in the plurality of user input elements is chosen (6006) based on proximity of the user input element to the contact.

In some embodiments, a point (e.g., 4106, FIG. 5A) is determined (6008) within the area of contact. In some embodiments, the point within the area of contact is the centroid (6026) the area of contact. In some embodiments, the point within the area of contact is offset (6028) from the centroid of the urea of contact.

In some embodiments, a user input element (e.g., 4102-1, FIG. 5A) in the plurality of user input elements is chosen (6006) based on proximity of the user input element to the determined point (e.g., 4106, FIG. 5A). In some embodiments, choosing is limited to user input elements located within the area of contact. In some embodiments, choosing is limited to user input elements that at least partially overlap with the area of contact. In some embodiments, choosing is limited to user input elements located within a predetermined distance from the determined point (6030). In some embodiments, the content. on the touch screen display has an associated scale factor, and the choosing is limited to user input elements located within a distance from the determined point that is determined in accordance with the scale factor (6032).

Information associated with the chosen user input element is displayed (6010) over the displayed content (e.g., 'Accounts' Menu 4108-1, FIG. 5A). In some embodiments, the displayed information associated with the chosen user input element comprises a description of the chosen user input element (6034).

In some embodiments, the information associated with the chosen user input element is displayed outside the area of contact (6038). In some embodiments, the location of the information associated with the chosen user input element displayed over the displayed content depends on the location of the contact (6036). In some embodiments, the location of the information associated with the chosen user input clement is displayed over the top half of the displayed content if the location of the contact is in the bottom half of the displayed content and the location of the information associated with the chosen user input element is displayed over the bottom half of the displayed content if the location of the contact is in the top half of the displayed content.

In some embodiments, the information associated with the chosen user input element is displayed (6040) after the contact is maintained for at least a predetermined time. In some embodiments, the displayed information associated with the chosen user input element is removed (6042) if the contact with the touch screen is maintained for greater than a predetermined time.

A break is detected (6012) in the contact by the finger with the touch screen display. In some embodiments, detecting the break in the contact comprises detecting the break in the contact while the information associated with the chosen user input element is displayed (6044).

In some embodiments, in response to detecting the break in the contact by the finger with the touch screen display, an area is enlarged (6046) that includes the chosen user input element on the touch screen display (e.g., for element 4102-1, area 4114-1 in FIG. 5A is enlarged in FIG. 5B; similarly, for element 4102-3 and 4102-4, area 4114-2 in FIG. 5D is enlarged in FIG. 5E).

In some embodiments, in response to detecting the break in the contact by the finger with the touch screen display prior to expiration of a predetermined time, the chosen user input element is enlarged on the touch screen display (e.g., element 4102-1 in FIG. 5A is enlarged in FIG. 5B; similarly, elements 4102-3 and 4102-4 in FIG. 5D are enlarged in FIG. 5E).

Input is received (6014) for the chosen user input element. In some embodiments, receiving input comprises: receiving text input via a soft keyboard (6048) on the touch screen display (e.g., keyboard 616, FIG. 5E), detecting a finger contact with a radio button (6050) on the touch screen display, detecting a finger contact with a check box (6052) on the touch screen display, or detecting a finger contact with an item in a pull down list (6054) on the touch screen display (e.g., contact 4120 on input choice 4118-3, FIG. 5B).

In some embodiments, the received input is sent (6056) to a remote computer, such as a web server. For example, input received in user input elements 4102-3 and 4102-4 (FIG. 5E) is sent to a remote server upon detection of a finger contact (or a break in finger contact) with the submit icon 4126.

Figure 6D:
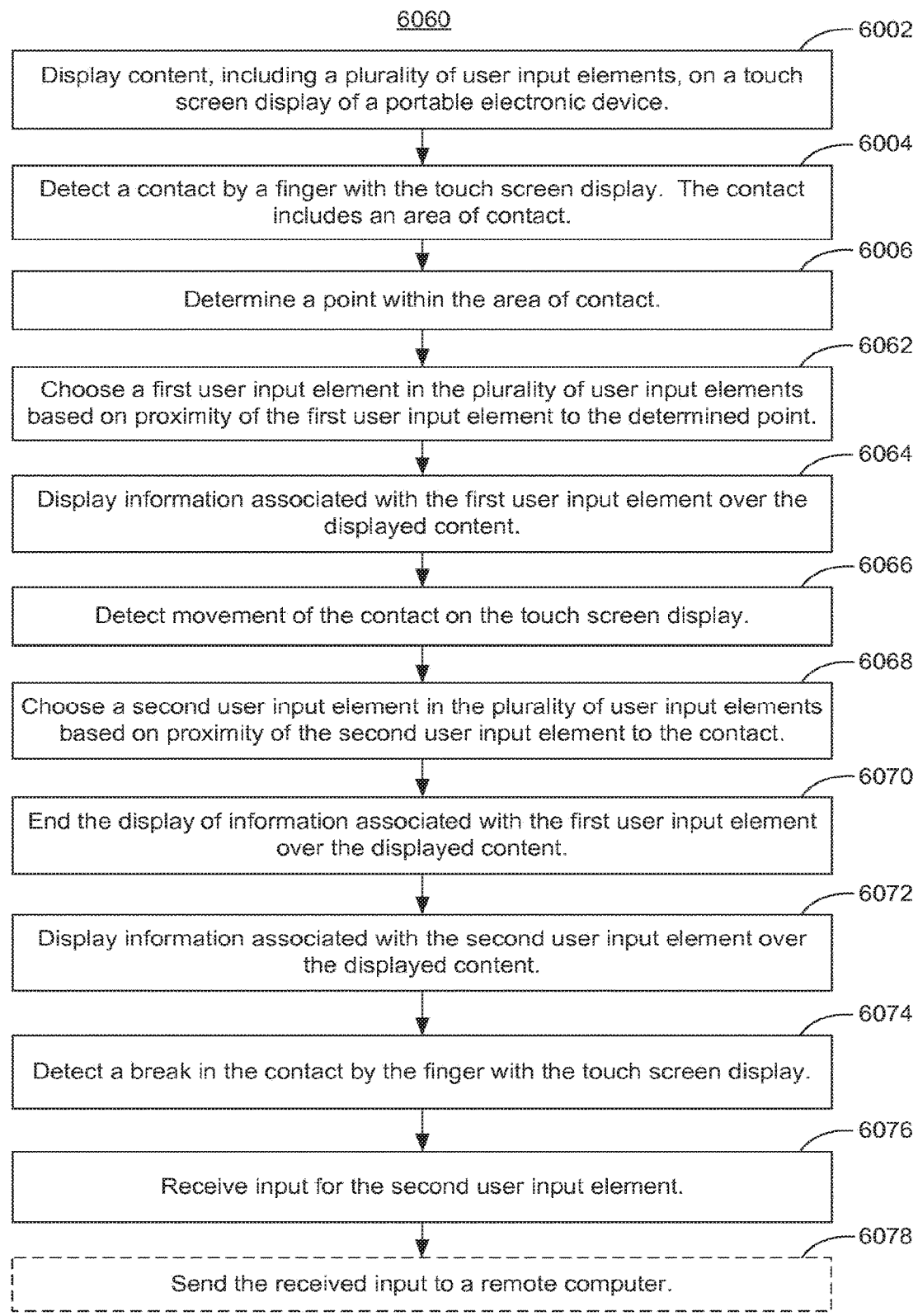

FIG. 6D is a flow diagram illustrating a method 6060 for receiving input in accordance it some embodiments. Operations 6002 and 6004 are performed as described above with regard to methods 6000 (FIG. 6A) and 6020 (FIGS. 6B-6C).

A first user input element (e.g., 4102-1, FIG. 5A) in the plurality of user input elements is chosen (6002) based on proximity of the first user input element to the contact. In some embodiments, choosing is limited to user input elements located within the area of contact. In some embodiments, choosing is limited to user input elements that at least partially overlap with the area of contact. In some embodiments, choosing is limited to user input elements located within a predetermined distance from the determined point. In some embodiments, the content on the touch screen display has an associated scale factor, and the choosing is limited to user input elements located within a distance from the determined point that is determined in accordance with the scale factor.

Information associated with the first user input element is displayed (6064) over the displayed content (e.g., Accounts Menu 4108-1, FIG. 5A). In some embodiments, the displayed information associated with the first user input element comprises a description of the first user input element.

Movement of the contact is detected (6066) on the touch screen display (e.g., movement 4110-1, FIG. 5C). A second user input element (e.g., element 4102-2, FIG. 5C) in the plurality of user input elements is chosen (6068) based on proximity of the second user input element to the contact (e.g., contact 4104, FIG. 5C). The display of information associated with the first chosen user input element over the displayed content ended (6070). Information associated with the second chosen user input element is displayed (6072) over the displayed content (e.g., 'sign in' button 4108-3, FIG. 5C).

A break is detected (6074) in the contact by the finger with the touch screen display. Input is received (6076) for the second user input element. In some embodiments, receiving input comprises: receiving text input via a soft keyboard on the touch screen display (e.g., keyboard 616, FIG. 5E), detecting a finger contact with a radio button on the touch screen display, detecting a finger contact with a check box on the touch screen display, or detecting a finger contact with an item in a pull down list on the touch screen display (e.g., contact 4120 on input choice 4118-3, FIG. 5B).

In some embodiments, the received input is sent (6078) to a remote computer, such as a web server. For example, input received in user input elements 4102-3 and 4102-4 (FIG. 5E) is sent to a remote server upon detection of a finger contact (or a break in finger contact) with the submit icon 4126.

Figure 6E:
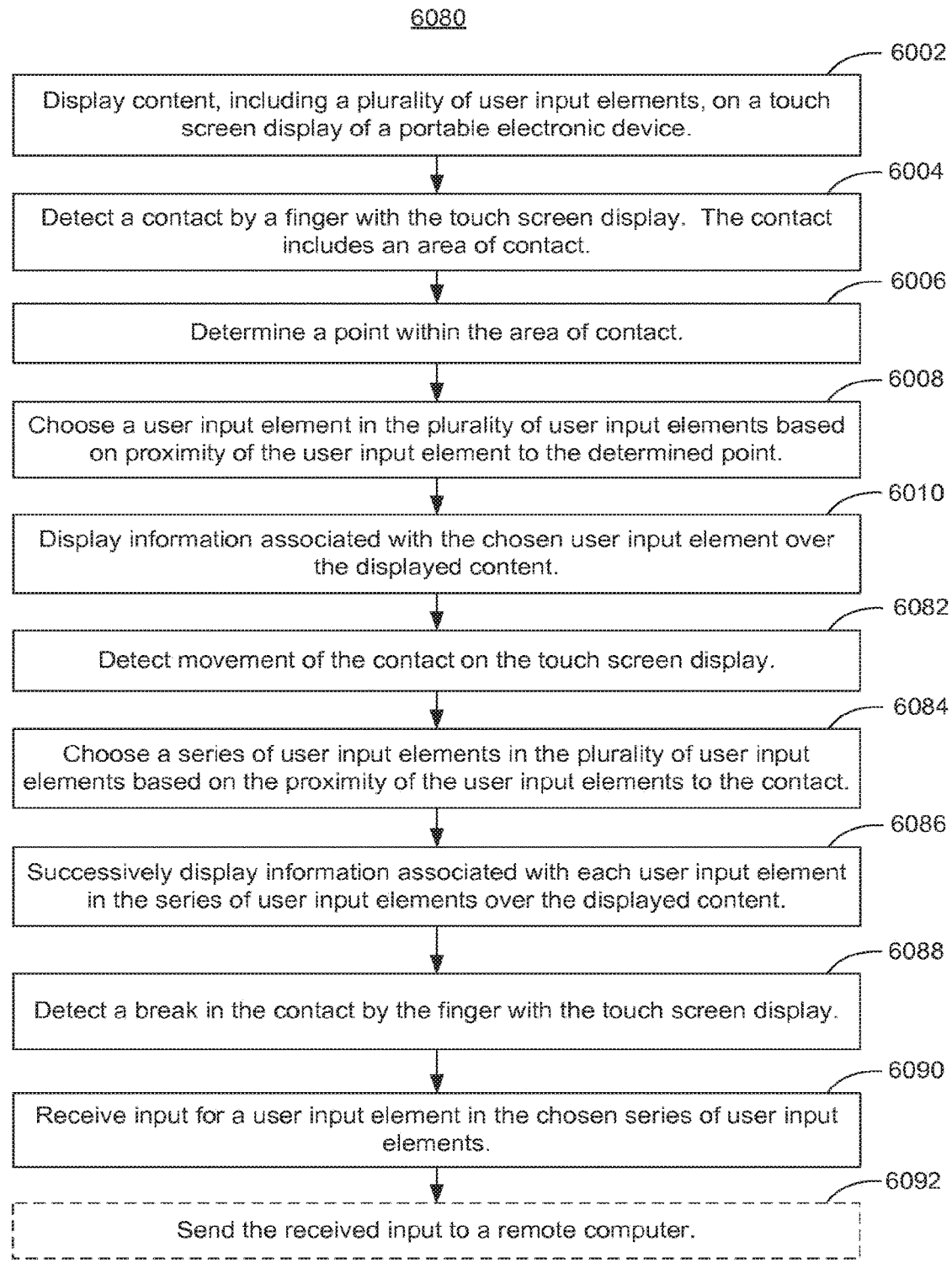

FIG. 6E is a flow diagram illustrating a method 6080 for receiving input in accordance with some embodiments. Operations 6002, 6004, 6006, and 6010 are performed as described above with regard to methods 6000 (FIG. 6A) and 6020 (FIGS. 6B-6C).

Movement of the contact on the touch screen display is detected (6082) (e.g., movement 4110-1 in FIG. 5C, and movement 4110-2 in FIG. 5D). A series of user input elements in the plurality of user input elements are chosen (6084) based on the proximity of the user input elements to the contact (e.g., element 4102-2 in FIG. 5C, and elements 4102-3 and 4102-4 in FIG. 5D). Information associated with each user input element in the series of user input elements is successively displayed over the displayed content (e.g., information 4108-3 in FIG. 5C, and information 4108-4 in FIG. 5D).

A break is detected (6088) in the contact by the finger with the touch screen display. Input is received (6090) for a user input element in the chosen series of user input elements. In some embodiments, receiving input comprises: receiving text input via a soft keyboard on the touch screen display (e.g., keyboard 616, FIG. 5E), detecting a finger contact with a radio button on the touch screen display, detecting a finger contact with a check box on the touch screen display, or detecting a finger contact with an item in a pull down list on the touch screen display (e.g., contact 4120 on input choice 4118-3, FIG. 5B).

In some embodiments, the received input is sent (6092) to a remote computer, such as a web server. For example, input received in user input elements 4102-3 and 4102-4 (FIG. 5E) is sent to a remote server upon detection of a finger contact (or a break in. finger contact) with the submit icon 4126.

A graphical user interface (e.g., UI 4100A, FIG. 5A) on a portable multifunction device with a touch screen display comprises: (1) content 4112 that includes a plurality of user input elements 4102, and (2) information 4108-1 associated with a first user input element 41021 in the plurality of user input elements. In response to the detection of a contact 4104 of a finger with the touch screen display: the first user input element 4102-1 is chosen based on proximity of the first user input element to the contact, and the information 4108-1 associated with the first user input element is displayed over the content. In response to detecting a break in the contact by the finger with the touch screen display, an area is enlarged that includes the first user input element on the touch screen display (e.g., for element 4102-1, area 4114-1 in FIG. 5A is enlarged in FIG. 5B). Input is received for the first user input element.

Using interfaces such as 4100A-4100E, and methods such as methods 6000, 6020, 6060 and 6080, a user may more easily view information associated with input elements and provide input on a portable device using finger contacts on a touch screen. The user is relieved of having to worry about the precision of his finger contact with respect to selection of input elements. Furthermore, the user can view information and provide input even if the input elements are initially displayed at such a small size that the elements are illegible or barely legible.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable multifunction device, comprising:
a display;
a touch-sensitive surface;
one or more processors;
memory; and
one or more programs, wherein the one or more programs are stored in the memory and configured to be executed by the one or more processors, the one or more programs including instructions for:
displaying an application on the display, wherein the application includes a plurality of input elements that include a first user input element and a second user input element;
detecting a first input on the touch-sensitive surface that corresponds to selection of the first user input element;
in response to detecting the first input that corresponds to the selection of the first user input element:
enlarging and centering display of a first area, wherein the enlarged first area includes the first input element and at least a portion of the second user input element; and
while displaying the enlarged first area:
detecting a second input that corresponds to selection of the second user input element;
in response to detecting the second input that corresponds to selection of the second user input element:
centering display of the second input element; and
subsequent to detecting the second input, receiving input for the second user input element; and
in response to receiving the input for the second user input element, displaying a representation of the received input in the second user input element.

2. The device of claim 1, wherein the first input element is centroid to the first area.

3. The device of claim 1, wherein detecting the first input includes detecting liftoff of a contact from the touch-sensitive surface.

4. The device of claim 1, wherein, prior to detecting selection of the first user input element, the first user input element is offset with respect to a respective axis of the display.

5. The device of claim 1, wherein the application is one of: a word processing document, a spreadsheet document, an email, a web browser, or a presentation document.

6. The device of claim 1, wherein the first user input element includes a user input element selected from the set consisting of: a text input field, a pull down list, and a form field.

7. The device of claim 1, wherein enlarging and centering display of a first area includes enlarging text that associated with the first input element.

8. The device of claim 1, wherein the second user input element includes a user input element selected from the set consisting of: a text input field, a pull down list, and a form field.

9. The device of claim 1, wherein the enlarged second area includes at least a portion of the first user input element.

10. A non-transitory computer-readable storage medium storing one or more programs configured to be executed by one or more processors of an electronic device with a display and a touch-sensitive surface, the one or more programs including instructions for:
displaying an application on the display, wherein the application includes a plurality of input elements that include a first user input element and a second user input element;
detecting a first input on the touch-sensitive surface that corresponds to selection of the first user input element;
in response to detecting the first input that corresponds to the selection of the first user input element:
enlarging and centering display of a first area, wherein the enlarged first area includes the first input element and at least a portion of the second user input element; and
while displaying the enlarged first area:
detecting a second input that corresponds to selection of the second user input element;
in response to detecting the second input that corresponds to selection of the second user input element:
centering display of the second input element; and
subsequent to detecting the second input, receiving input for the second user input element; and
in response to receiving the input for the second user input element, displaying a representation of the received input in the second user input element.

11. The non-transitory computer-readable storage medium of claim 10, wherein the first input element is centroid to the first area.

12. The non-transitory computer-readable storage medium of claim 10, wherein detecting the first input includes detecting liftoff of a contact from the touch-sensitive surface.

13. The non-transitory computer-readable storage medium of claim 10, wherein, prior to detecting selection of the first user input element, the first user input element is offset with respect to a respective axis of the display.

14. The non-transitory computer-readable storage medium of claim 10, wherein the application is one of: a word processing document, a spreadsheet document, an email, a web browser, or a presentation document.

15. The non-transitory computer-readable storage medium of claim 10, wherein the first user input element includes a user input element selected from the set consisting of: a text input field, a pull down list, and a form field.

16. The non-transitory computer-readable storage medium of claim 10, wherein enlarging and centering display of a first area includes enlarging text that associated with the first input element.

17. The non-transitory computer-readable storage medium of claim 10, wherein the second user input element includes a user input element selected from the set consisting of: a text input field, a pull down list, and a form field.

18. The non-transitory computer-readable storage medium of claim 10, wherein the enlarged second area includes at least a portion of the first user input element.

19. A method, comprising:
at an electronic device with a display and a touch-sensitive surface:
   displaying an application on the display, wherein the application includes a plurality of input elements that include a first user input element and a second user input element;
   detecting a first input on the touch-sensitive surface that corresponds to selection of the first user input element;
   in response to detecting the first input that corresponds to the selection of the first user input element:
      enlarging and centering display of a first area, wherein the enlarged first area includes the first input element and at least a portion of the second user input element; and
   while displaying the enlarged first area:
      detecting a second input that corresponds to selection of the second user input element;
      in response to detecting the second input that corresponds to selection of the second user input element: centering display of the second input element; and
      subsequent to detecting the second input, receiving input for the second user input element; and
      in response to receiving the input for the second user input element, displaying a representation of the received input in the second user input element.

20. The method of claim 19, wherein the first input element is centroid to the first area.

21. The method of claim 19, wherein detecting the first input includes detecting liftoff of a contact from the touch-sensitive surface.

22. The method of claim 19, wherein, prior to detecting selection of the first user input element, the first user input element is offset with respect to a respective axis of the display.

23. The method of claim 19, wherein the application is one of: a word processing document, a spreadsheet document, an email, a web browser, or a presentation document.

24. The method of claim 19, wherein the first user input element includes a user input element selected from the set consisting of: a text input field, a pull down list, and a form field.

25. The method of claim 19, wherein enlarging and centering display of a first area includes enlarging text that associated with the first input element.

26. The method of claim 19, wherein the second user input element includes a user input element selected from the set consisting of: a text input field, a pull down list, and a form field.

27. The method of claim 19, wherein the enlarged second area includes at least a portion of the first user input element.

* * * * *